June 10, 1969   R. J. YANKO ET AL   3,449,540
NUMERICALLY CONTROLLED AUTOMATIC POSITIONING
AND WELDING APPARATUS
Filed Feb. 23, 1966
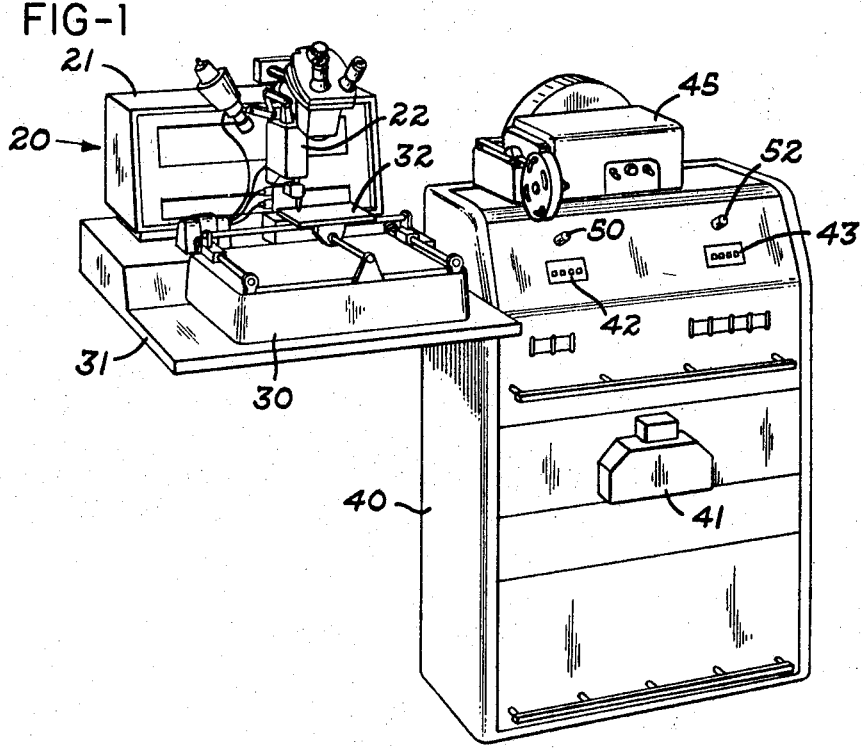
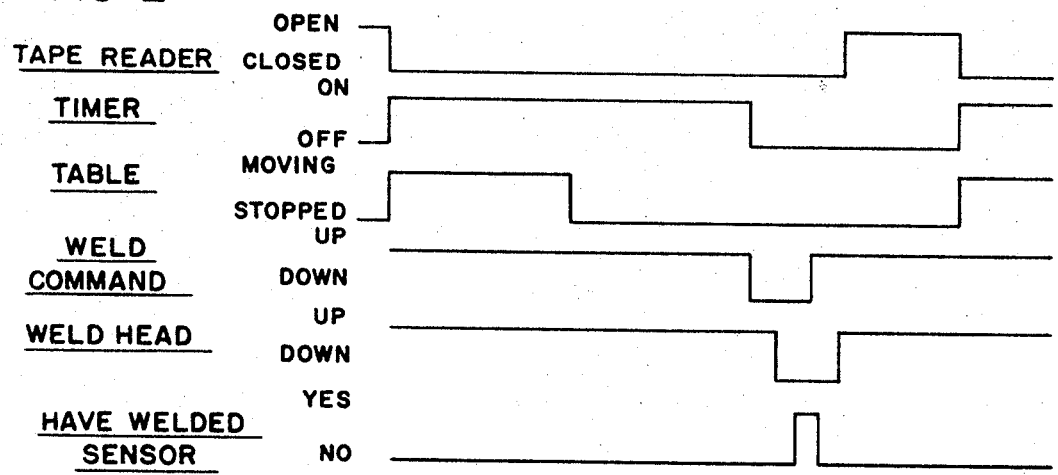
INVENTORS
RICHARD J. YANKO,
JOHN K. PENROD &
GEORGE W. JENSEN
*Mareshal, Biebel, French & Bugg*
ATTORNEYS

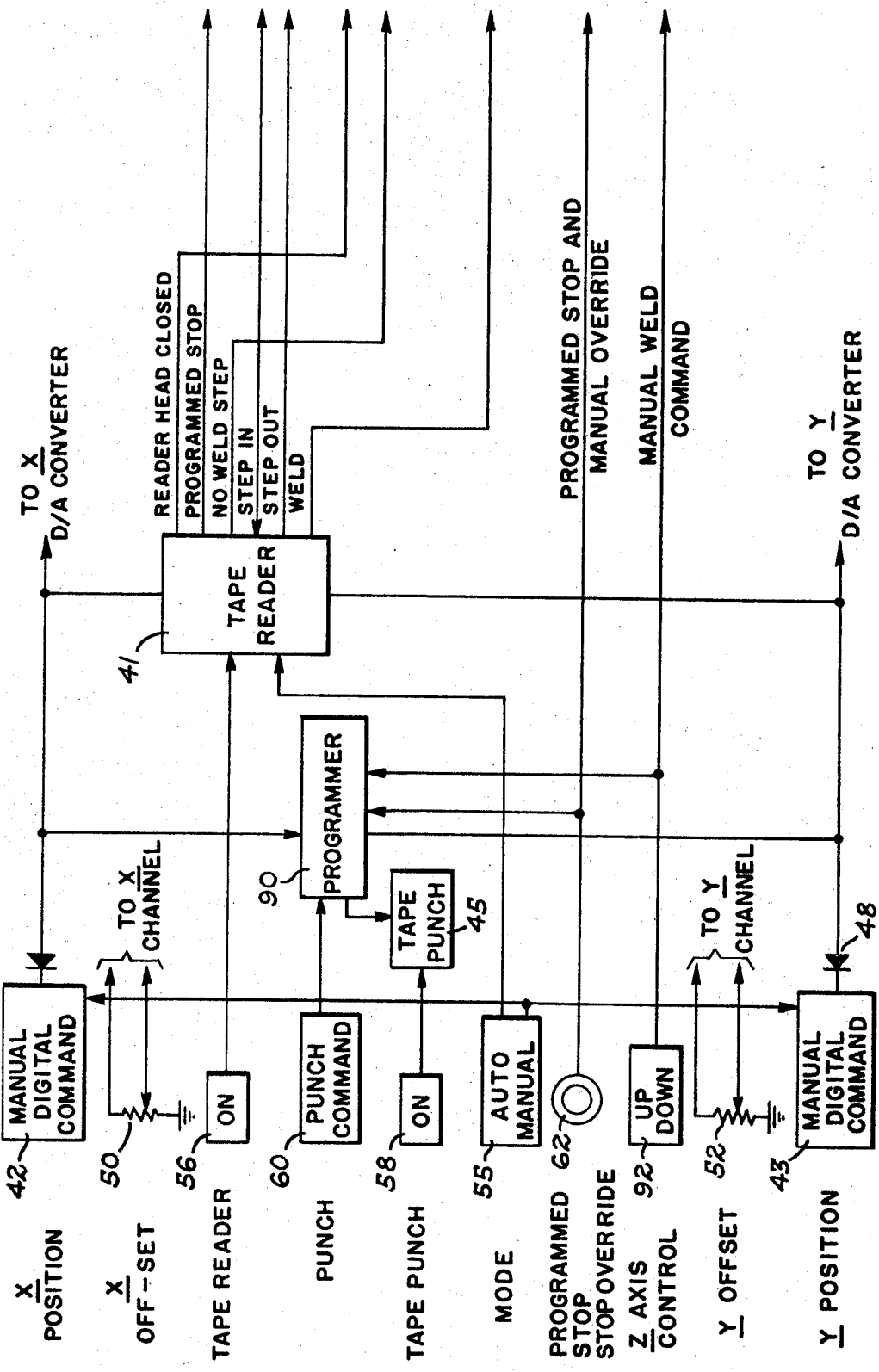

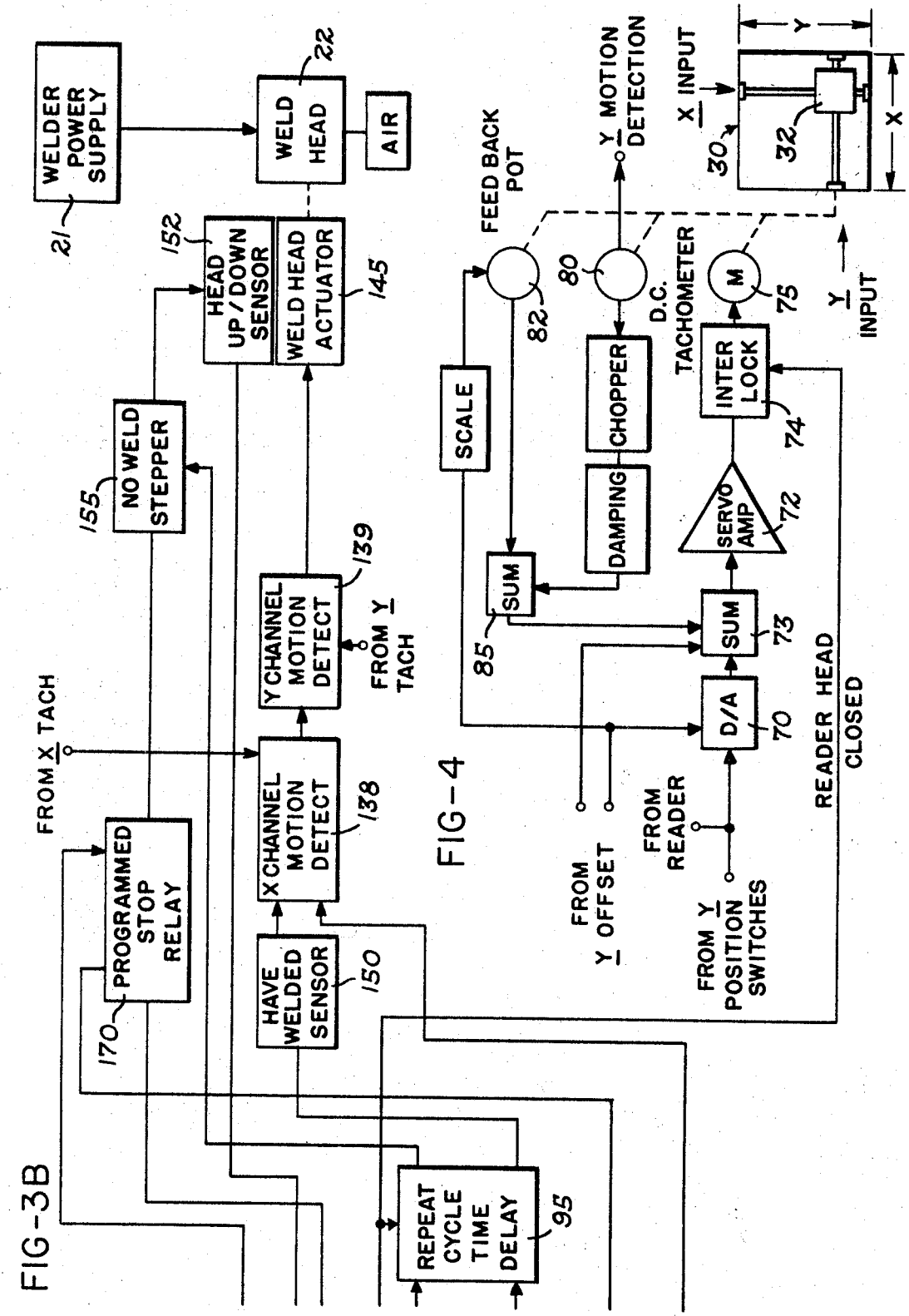

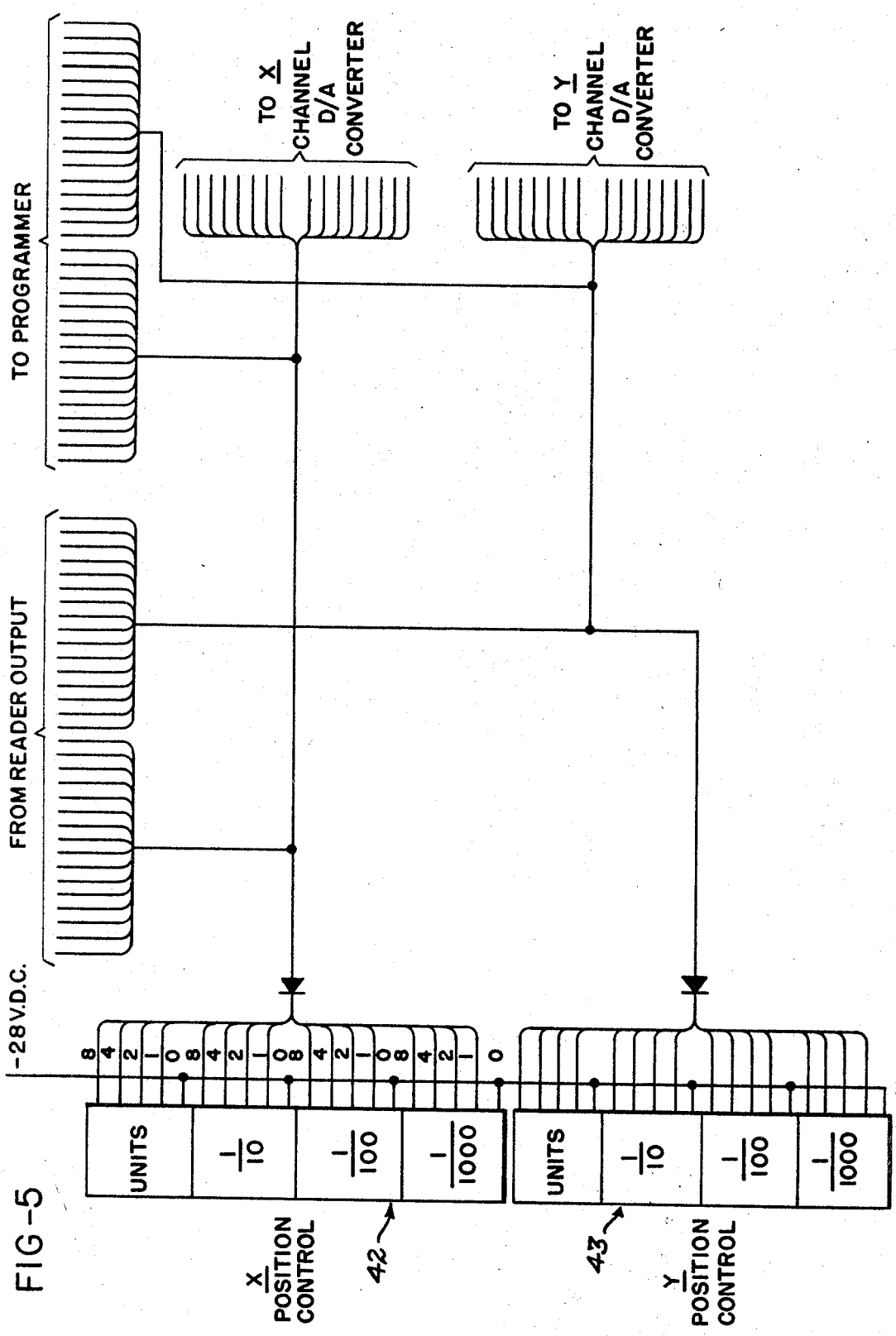

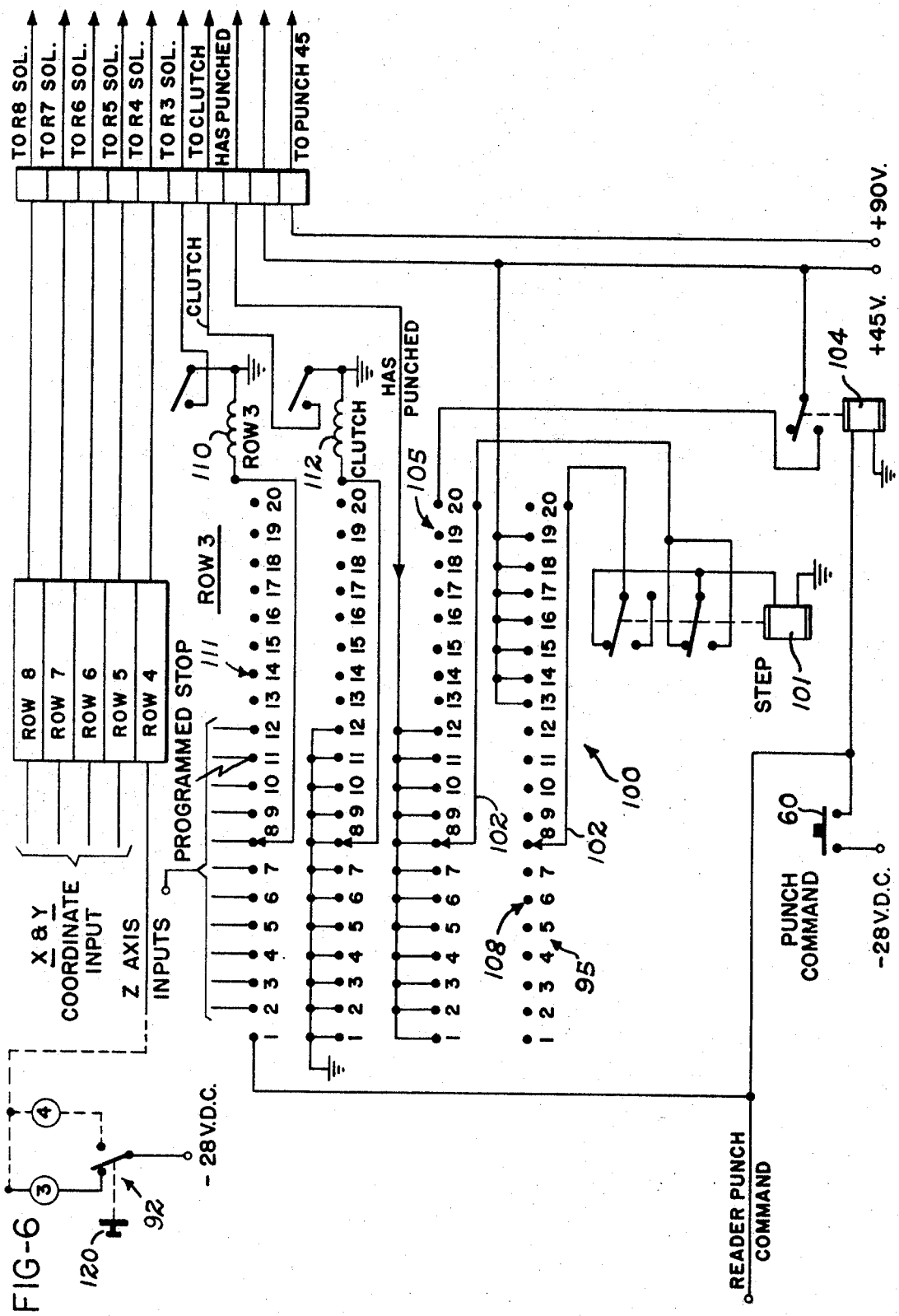

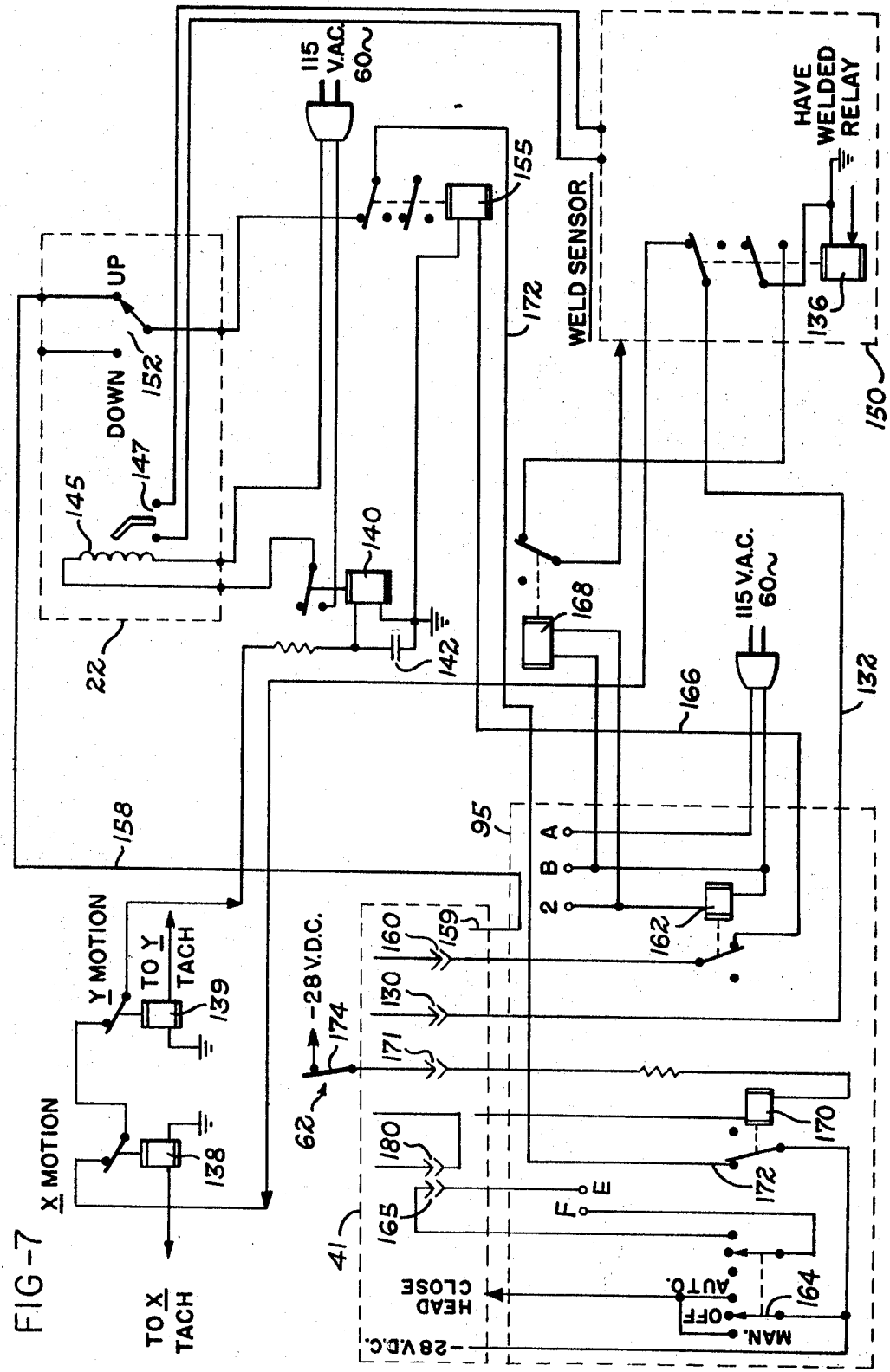

United States Patent Office 3,449,540
Patented June 10, 1969

3,449,540
NUMERICALLY CONTROLLED AUTOMATIC POSITIONING AND WELDING APPARATUS
Richard J. Yanko, Fairborn, John K. Penrod, Bellbrook, and George W. Jensen, Dayton, Ohio, assignors to Arvin Systems, Inc., Yellow Springs, Ohio, a corporation of Ohio
Filed Feb. 23, 1966, Ser. No. 529,500
Int. Cl. B23k 11/10
U.S. Cl. 219—80  12 Claims

ABSTRACT OF THE DISCLOSURE

A numerically controlled automatic positioning and welding system employs an analog X-Y plotter table and switches for selecting the position of the table in relation to a workpiece, which is usually a small electrical component or circuit board, having parts which are to be welded. As desired positions are located by the manual operation of the digital input switches, a block type tape punch is actuated to record these positions, and to enter a weld command signal as desired. An automatic welder is provided which is controlled from the tape concurrently with the control of the plotter to effect welds at the predetermined and previously located positions with respect to the workpiece.

---

This invention relates to automatic welding and more particularly to a numerically controlled automatic welding system for making welds at precise coordinate positions on electric parts, such as miniature circuit boards, wafers, and the like.

The electrical contacts and electrical connections on circuit boards and miniature circuit components must be made with at least the same precision as that which went into the making of the board itself. Such connections are now commonly made by manually positioning the board while observing the same through an optical aid, such as through a microscope, followed by manually making the electrical connection. This invention provides an automatic high speed, numerically controlled, welding system for positioning parts to be welded at precise X and Y coordinates, and further provides for the automatic welding of these parts at such precisely located positions. A control system which is numerically controlled, by means of a punched tape for example, controls the operation of an X-Y plotter table in relation to a relatively fixed welding head, causes the head to make a weld at discretely located positions, and thereafter causes the table to move or shift to the next desired position. The master control system permits the programming of auxiliary functions, and further provides for the on-line programming of a tape, or other form of reuseable record in accordance with actual observed position of the part with respect to the welding head.

The on-line programming function of the control system of this invention permits a part to be manually positioned through the system while the operator observes the actual location of the part with respect to the welding head. On command, the system is then caused to punch a tape on which the coordinate position, corresponding to the part as observed, is recorded. At the same time, the operator may punch in other desired commands, such as a welding command for causing the weld head automatically to make a weld at such observed positions. Further, the system may be caused either automatically to stop or hold at that location or to proceed automatically to the next desired position on the workpiece. Thereafter, the punched tape may be inserted in a reader, and after initial orientation of the part, the system then proceeds to position subsequent workpieces and make welds thereon automatically without further control by the opeartor.

The control system includes provision by which the automatic function can be overridden or eliminated, when desired, and the table positioned by means of manual digital inputs. Further, the system includes apparatus for making a new tape directly off of an old tape, such as for renewing the tape or making duplicate tapes.

It is accordingly a primary object of this invention to provide an automatic, numerically-controlled welding system for making welds at precise coordinate positions on electric parts, as outlined above.

Further object of this invention is the provision of an automatic welding system having an on-line programming function through which a permanent record of actual positions of an X-Y plotter table can be created in which an operator, working through the system inputs, manually positions the table while observing the position of a part on the table. Therefore, the opeartor need not be concerned with the actual value of the X and Y coordinate positions which he has selected, but these are directly inserted from the manual control into the permanent record, such as a punched tape.

A further object of the invention is the provision of an automatic welding system, as outlined above, which is tape controlled and which includes a tape reader and a suitable control system for automatically causing the table and the welding head to perform all necessary movements to effect welds at a plurality of successively chosen discrete positions with regard to a workpiece on the table.

A more specific object of this invention is the provision of a numerically controlled welding system in which coordinate positions of an X-Y plotter table and weld signals are stored in block form in a tape, with a block tape reader and automatic control systems for controlling the operation of the table and a movable welding head, in sequential relation.

Another object of this invention is the provision, in an automatic welding system, as outlined above, of motion detecting means for preventing the automatic operation of a welding head until all motion in either the X or Y direction has ceased.

A still further object of the invention is the provision, in an automatic welding station as outlined above, of a programmer and appaartus control by the programmer for forming a permanent record of discrete X and Y positions of the plotter table, utilizing digital information directly from the system inputs and thereby reducing error due to constant non-linearities in the analog positioning system.

These and other objects and advantages of the present invention will become apparent from the following description, the accompanying drawings and the appended claims.

In the drawing—

FIG. 1 is a perspective view of an automatic welding system constructed according to this invention;

FIG. 2 is a chart of the timing sequence of this invention;

FIGS. 3A and 3B are combined block and function diagrams of the invention;

FIG. 4 is a further block and function diagram of the Y-channel converter and analog drive;

FIG. 5 is a wiring diagram showing the interconnection of the digital input switches, the reader, the programmer, and the X and Y channel inputs;

FIG. 6 is a schematic diagram of the programmer;

FIG. 7 is a schematic diagram of a portion of the system including the welding station.

Figure 8:
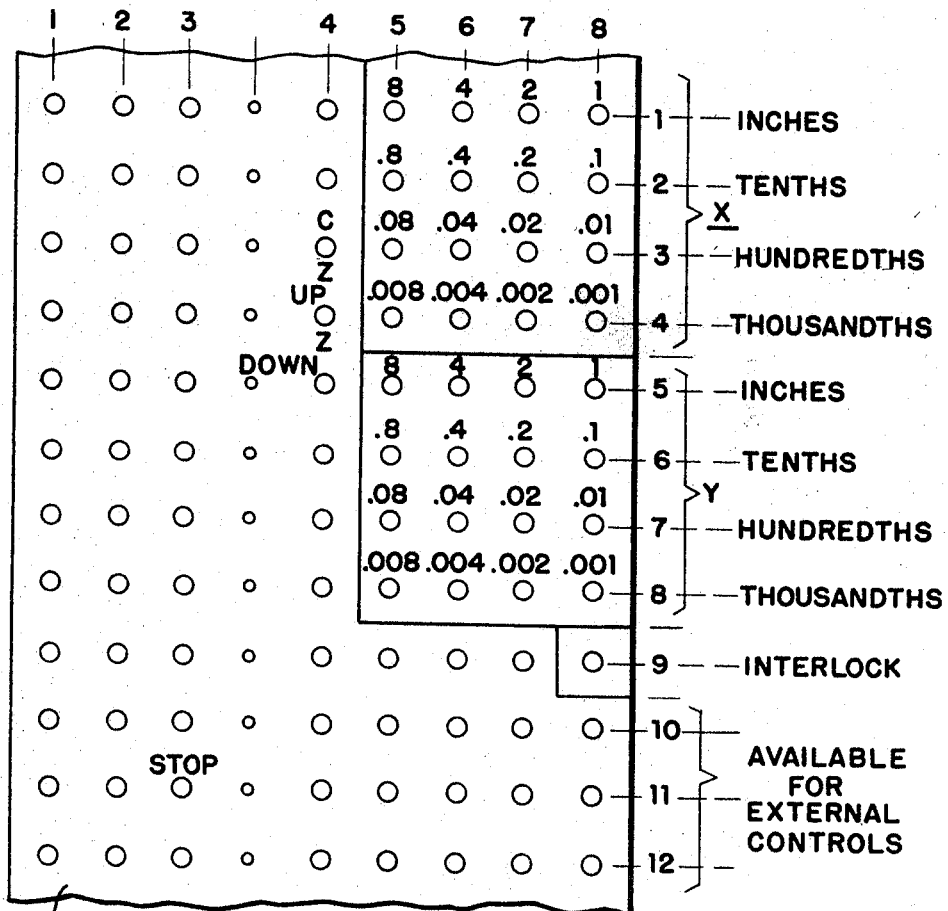
FIG. 8 is a diagram of one block of the tape.

Referring to the figures of the drawing which illustrate a preferred embodiment of the invention, an automatic welding system constructed according to this invention is shown in FIG. 1 as including a welder 20. The welder 20 includes a control unit 21 and a movable or controllable welding head 22. The welder head 22 may be controlled for movement in a Z axis between a normally raised position and a lowered welding position. In the lowered position, parallel gap electrodes automatically make a weld on a workpiece, such as a printed circuit board. The circuit in the control unit 21 automatically senses the completion of the weld and provides a signal thereof so that the head 22 may be raised or retracted. A welder which is suitable for use with this invention is the model MCW/EL of Hughes Aircraft Company, 2020 N. Oceanside Blvd., Oceanside, Calif.

The system includes an X-Y plotter table 30 which is mounted on a suitable support 31 in fixed relation to the welder 20. The plotter includes a workpiece support platform 32 which is movable into a plurality of X and Y coordinate positions with respect to the welder head 20. Accordingly, the plotter 30 has separate X and Y inputs, and an accurate electrical follow-up system. The platform 32 forms the means for receiving an electrical part thereon, such as a miniature circuit board, and for accurately positioning such part so that it may be welded at discrete X and Y coordinate positions or have electrical connections made thereto at such locations by the welder 20.

The system further includes a control console or cabinet 40 within which are mounted most of the electrical circuits including the programmer, the digital-to-analog converters, and a block tape reader 41. The reader 41 provides the means for reading out digital information stored in a tape corresponding to desired movements of the platform 32 and the welder 20. A suitable reader for use with the system of this invention may be the model SBR 642 of Chalco Engineering Corporation, 15126 S. Broadway, Gardena, Calif.

The console 40 further includes manually operable digital X and Y coordinate input switches 42 and 43. The switches 42 and 43 provide the means by which discrete X and Y coordinate table positions are manually selected, and by which the plotter table is driven through a suitable converter circuit.

The system further includes a block tape punch 45 which is operated through the control system to generate a permanent record corresponding to the actual observed positions of an article on platform 32, and by which suitable control or weld signals may also be inserted. The tape punch 45 may be the Model 2 Motorized Tape Punch of Friden, Inc., 2352 Washington Ave., San Leandro, Calif., and is controlled by a programmer which reads out the actual positions of the inputs including the digital X and Y input switches 42 and 43.

The overall system components and operation of this invention can best be understood by reference to FIGS. 3A and 3B, together with FIGS. 4 and 5. The primary system inputs and controls are shown adjacent the left hand margin of FIG. 3A. The invention includes means for manually setting in coordinate X and Y positions, and this includes the digital X position switch 42 and the Y position switch 43. The switches 42 and 43 are manually operated from the front panel of the control console 40, and may be rotated by the operator while observing the actual position of an article on the platform 32 with respect to the welder head 22. The switches 42 and 43 may be identical in construction and are divided into separate units, tenths, hundredths, and thousandths inch sections, such as shown in FIG. 5, and operate to close circuits in accordance with the digital code 01248. The output of each position of the switch is applied through an isolation diode, shown diagrammatically at 48, to respective X and Y digital-to-analog converters and closed servo-loop drive systems for the X and Y inputs of a plotter table 30 (FIG. 4).

Associated with each of the digital switches 42 and 43 are X and Y offset potentiometers indicated respectively at 50 and 52 in FIG. 3A. These potentiometers are slewing controls for the plotter 30, and may be set to provide given X and Y plotter offsets from a reference point. Accordingly, the offset potentiometers 50 and 52 are effective during either manual or automatic modes to position the starting point of the table accurately with respect to a workpiece mounted thereon.

The X and Y position controls and the corresponding offset controls provide the means for remotely commanding the platform 32 to precise X-Y coordinate positions within the useable area. In addition, the X and Y switches 42 and 43 provide means for storing digital information representing desired plotter positions which may be read out by a suitable programmer, and a tape punched of these actual positions. By punching such a tape on-line, compensation is made for any non-linearity in the amplifiers or in the X and Y drives, since the information stored in the tape represents the X and Y coordinates stored in the switches which, in turn, represent the actual observed position of the table 32 or the workpiece mounted on the table.

The controls further include a mode selector switch 55, by mean of which the digital switches 42 and 43 may be disconnected from the system, and the tape reader connected in their place. A tape reader control 56 controls the operation of the tape reader 41. The tape punch on-off switch 58 controls the power to the tape punch 45.

A tape punch command control switch 60 initiates automatic programmer operation to effect a cycle of readout when it is desired to make a tape corresponding to a given position of the platform 32, as represented by the positions of the manually operated controls. Finally a programmed stop and stop override switch 62 comprising a double-throw, single-pole switch, is operated, to provide an automatic stop when programming a tape, and further serves as a stop override during automatic positioning.

As shown perhaps more clearly in FIG. 5, the outputs of the X and Y digital switches 42 and 43 are applied respectively to the X and Y channel drives. The Y channel control is shown in FIG. 4 as including a digital-to-analog converter 70 which drives a servo amplifier subsystem 72 through a feed-back summing network 73 and an interlock relay 74 to operate a single phase Y positioning servo motor 75. The servo motor 75 is preferably operated on 400 cycle, single-phase power and drives a DC feedback tachometer 80 and a high-precision linear film feedback position potentiometer 82. Two outputs are taken from the DC tachometer 80. The first is chopped, damped, and applied to a summing circuit 85 as an inverse damping feedback for the servo motor drive amplifier 72. The damped feedback is summed with the output signal of the feedback potentiometer, and this combined signal is applied through the summing network 73 to the servo amplifier subsystem 72. Accordingly, the tachometer 80 provides damping for the slewing operation in the Y direction. The circuit is therefore damped for rate and provides accurate and rapid positioning of the platform 32 in the Y direction.

The interlock 74 receives a signal from the reader and removes the drive from the motors 75 during the times that the tape is advancing in the reader. After the reader head is closed, the motor is again enabled. A second output from the tachometer 80 is used as a Y motion detector for preventing automatic operation of the Z axis or the welding head until the platform 32 has come to a complete stop.

A circuit identical to that shown in FIG. 4 is employed for driving the platform 32 in the X direction, except that the inputs thereto are connected respectively to receive the X signal information from the switch 42, the potentiometer 50, and the corresponding outputs of the tape reader.

As further shown in FIGS. 3A and 5, a programmer 90 is connected to receive input information from the X and Y digital position control switches 42 and 43, and information from the command switches corresponding to all of the control information which is to be recorded and stored on the tape. This includes a weld or no-weld signal which is applied by a Z axis or weld control 92 and a programmer stop as applied by the switch 62. The operation of the programmer 90 is more particularly described in connection with FIG. 6 below.

As further shown in FIG. 5, the tape reader 41 is connected effectively in parallel with the digital inputs to the X and Y drive channels. Further, the tape reader 41 provides weld and no-weld signals to the welder control circuit shown diagrammatically in FIG. 3B, and described in greater detail in FIG. 7. These signals, as well as the "head closed" signal, are applied to the welder control through a timing clock or time delay relay circuit 95 shown in FIG. 3A. Receipt of a weld command from the tape reader 41 initiates the operation of a readout time by the timer 95; and provided motion has ceased in both the X and Y channels, the weld head 22 is actuated through the circuits shown in FIG. 3B or if no weld is called for, the timer causes the reader to advance to the next position. The circuit components and controls for the operation of the weld head 22 are described in greater detail in connection with FIG. 7.

As previously noted, one of the important advantages of the present invention is that of the ability to make a permanent record of the actual observed position of a part or workpiece on the platform 32 of the plotter table 30. A standard 8-row tape 96 is preferably used, as shown in FIG. 8, and the programmer 90 operates on command to control the operation of the tape punch 45 to insert into a block section of the tape, the digital information representing the actual position of the digital input switches 42 and 43, as well as the other desired command functions. The preferred location of the bits of stored digital information with respect to the lines and rows of holes on the tape 96 are shown in FIG. 8, although it is to be understood that other arrangements and other storage may obviously be employed without departing from the scope of this invention.

The programmer 90 accordingly includes means for operating the tape punch 45 line-by-line until a completed block of tape is punched, corresponding to the desired position of the plotter table and the functions to be performed at that position. Referring to FIG. 6, the programmer may consist of a stepping switch 100 which has a separate row or bank of switch contacts corresponding to each of the eight available rows 1 through 8 (FIG. 8) across the width of the tape 96. In addition, the switch 100 has two additional banks which perform control functions. The stepping coil 101 controls the advance of the switch by causing a ganged wiper 102 to move sequentially to each position of the switch banks with each operation of the coil. In this manner, the tape is punched line-by-line in accordance with whether a particular contact in a particular bank of the switch is energized.

The punch command switch 60 applies power momentarily to a punch control relay 104. This relay, when energized, applies a punch command signal to position 20 of switch bank 105, then drops out. This position, being the final position of the stepping switch, is also its resting position, and the relay 104 momentarily causes the stepping coil 101 to be energized through the wiper 102, and accordingly imitates the sequence of switch movements which read out the desired switch positions and controls. The stepping switch 100 will move sequentially from position 1 through position 12 by the receipt from the punch of a has-punched signal at the inputs 1 through 12 of the bank 105.

A further auxiliary switch bank 108 is provided with closed contacts 13 through 19 to cause the switch to complete its cycle of operation and to stop at the rest position 20.

During this sequential operation of the switch 100, whenever one of the positions of the X or Y digital input switches is closed or whenever a weld or a programmed stop is indicated, a signal is applied through a relay, such as the relay 110 associated with the "row 3" bank 111, to close a ground circuit to a corresponding input into the tape punch. At the same time, for each position, a clutch relay 112 is closed.

The punch 45 is mechanically operated by a cam shaft which makes a single revolution for each punching cycle. This cam shaft is under control of an electro-magnetically controlled, single-revolution clutch for connecting the cam shaft to a constantly running drive pulley. A feed hole is always punched in the tape during each revolution of the cam shaft and individual electro-magnets control the punching of the code holes during each revolution. Therefore, energizing the clutch relay 112 engages the punch and causes it to punch into the tape the holes representing the desired digital information.

This results in the digital numerical information being inserted within a block section of the tape which tape may subsequently be read in the reader 41 and applied to the system inputs to cause the system to repeat exactly its former position, and to cause a weld or a hold at that position, as programmed. The precise coordinate position at each location is not of primary concern to the operator since the programmer reads this information directly off of the manually operated input switches 42 and 43 and punches the tape accordingly. Non-linearities and non-uniformities in the operation of the plotter table and the plotter table drive, provided they are constant, do not affect the accuracy of the system.

The circuit positions associated with rows 1 and 2 are not shown in FIG. 6 since these rows are not used by the system. They may, however, be used to program additional information into the tape, as may be desired, apart from the functions described herein. Rows 5–8, as indicated, receive the X and Y coordinate information, and the inputs to these switch rows are connected respectively, as shown in FIG. 5, to the X and Y digital switches 42 and 43. Row 4 has been conveniently employed for programming the Z axis inputs which correspond to the desired positions of the welder head 22. For this purpose, the Z-axis control 92 of FIG. 3A, which is connected to both the programmer 100 and through the X and Y channel motion detectors to a weld head actuator of FIG. 3B, may be connected as shown in FIG. 6. Here, the welding head control is shown as including a single pole, double-throw switch, the purpose of which is to provide electrical signals corresponding to whether a weld is desired at the particular table location. These signals may be considered as welding head "up" or "down" signals. The switch 92 may be manually operated by the push button 120 for the purpose of providing a manual weld signal during the manual mode of operation. The remaining positions on row 4 are not used, as shown in the diagram of FIG. 8.

The programmed stop push button 62 of FIG. 3A may be depressed by the operator in order to program into the tape an automatic stop. This automatic stop may take any convenient location, and is shown herein as comprising hole 11 in row 3. It is therefore understood that position 11 in bank 111 of the programmer switch 100 is connected to receive a −28 volt DC signal when the programmed stop button 62 is depressed. The reader 41 is accordingly internally connected to stop automatically whenever a block includes a hole at this position. In addition, the programmed stop button 62 may be used as a stop override. A hole is punched in each block, for example at row 4, line 3, to provide a signal that the reader head has closed. Therefore, the corresponding terminal of the programmer 100, that is terminal 3 in row 4, will be energized. Also, an interlock hole is punched at line 9 of row 8.

The automatic welding system may also be used for renewing a tape or making additional duplicate tapes from a master. For this purpose, a hole may be punched, for example, by external command or by hand, at any convenient unusual coordinate position on the initial block of the tape for the purpose of applying a momentarily −28 volt DC signal on lead 122, FIG. 6. Alternatively, the punch command switch may be employed. The inputs to the rows 3 through 8 of the programmer may then be received directly from the reader 41 rather than from the X and Y position control switches with which they are in parallel. For this purpose, the manual inputs represented by these switches are disabled, such as by the removal of the −28 volt DC power supply from them. The tape reader may then be caused to progress in a step-by-step manner and a duplicate tape made on the punch 45 of the tape on the reader 41.

After a tape has been made in block-by-block manner, with each block on the tape identifying a particular position of the platform 32 and a particular function to be performed at that position, the prepared tape may then be removed from the punch 45 and applied to the reader 41 for causing the system automatically to perform identical functions on identical workpieces positioned on the table platform 32. The X and Y offset controls 50 and 52 remain operative in the automatic mode to permit the operator to position the table at a reference point with respect to the workpiece. It will be seen from an examination of FIGS. 3A, 3B, 4 and 5 that the outputs of the reader which correspond to the digital outputs of the X and Y positions are applied respectively to the digital-to-analog converters of the X and Y drive channels, the Y drive channel being shown in FIG. 4.

The manner in which the reader and the timer circuits control the Z axis or the operation of the welder 20 may be understood by reference to FIG. 7. In FIG. 7, a portion of the reader 41 is shown including a pair of contacts 130, representing the condition when the tape calls for a weld at a particular location, represented here by the presence of a hole in line 4 of row 4. A signal, such as a −28 volt DC supply, is applied through the contacts 130 on a line 132 to the normally closed contacts of a "have welded" relay 136. From there, this signal is applied through the normally closed contacts of an X motion detector relay 138 and a Y motion detector relay 139 to the solenoid coil of a welding relay 140. The operation of the motion detector relays 138 and 139 is controlled by the respective tachometers 80, and the contacts of these relays are held open by the tachometer output during movement of the platform 32. When all movement has stopped both in the X and Y direction the relays 138 and 139 are released thereby completing the circuit from the reader contacts 130 to the welding relay 140.

The operation of the welding relay is delayed for approximately 100 to 200 milliseconds by a capacitor 142 across the relay coil, to assure that all table motion has stopped before the relay 140 is actuated. When the relay 140 is energized, it energizes a solenoid 145 in the welding head 22 which causes the welding head and the associated welding contacts to move down into operative engagement with the workpiece on the platform 32. When the head is fully lowered, an electric circuit is made between a pair of sensing contacts 147 within the head 22, thereby closing a circuit to a weld sensor 150, located within the welder station 20. The weld sensor determines that a weld has been made, and operates the "have welded" relay 136 to break the holding circuit to the relay 140. The head 22 is now free to return to its raised position, and in doing so reestablishes an electrical circuit at a switch 152. This operates to apply a signal through the normally closed contacts of a non-weld relay 155 and a line 158 to the stepping input 159 of the reader 41. The reader 41 is then actuated to advance the tape into the next reading position by the operation of the stepping relay within the reader.

In the event that no weld is desired at the particular location, a signal is applied by the reader contacts 160, through normally closed contacts of a timer relay 162 to operate the coil of the no weld relay 155. The timer relay 162 is part of the timer 95. The purpose of this timer relay, as employed in this invention, is to provide an adjustable or controllable delay following the receipt of a no-weld signal by the reader 41 so that the system moves in an orderly fashion substantially in the same cycle of operation as if a weld command had been received. Further, the timer 95 functions to reset the weld sensor 150 in each cycle of operation where no weld is called for at the particular location of the workpiece. For example, the initial and final positions on the tape normally do not call for a weld. Also, it may be desirable to move the workpiece to additional programmed positions either for observation or manual manipulation without a weld.

The time delay relay 95 includes a transistorized timing circuit, the operation of which is initiated by a short circuit across its contacts E and F, FIG. 7. This circuit is completed through a timer control switch 164 which, in the automatic position, completes a circuit to contacts E and F through a pair of reader contacts 165. These contacts signal that the reader head has closed, and respond to the control hole designated by the letter C at row 4, line 3 of the block tape.

Following the closing of the head represented by a closing of the contacts 165, and assuming that no weld is called for, represented by the closing of the contacts 160, the timer 95 times out a predetermined interval, which may be in the order of 100 to 200 milliseconds, and then operates by the delayed energization and release of the timing relay coil 162 to interrupt the power of the coil of the stepping relay 155 by opening its contacts in line 166. This results in the release of the relay 155, thereby applying a pulse to the stepping input of the reader 41, in the same manner as if a weld had actually taken place. The timer 95 also operates a relay 168, the coil of which is placed in parallel with the coil 162. This causes a pulse to be applied to the weld sensor 150 for resetting the weld sensor for the next signal of operation.

The timer control switch 164, as shown, applies head closing power to the reader on line 170 in either the manual or the automatic positions, to cause the reader head to close automatically with each advance of the tape. However, in the manual position, the timer enabling command is removed from contacts E and F, and the timer 95 is thereby effectively removed from the circuit for manually controlled welds. Reference may be had to FIG. 2 for a diagram or a typical timing sequence of the system in the automatic mode of operation. The operation of the programmed stop function is also shown in FIG. 7. A stop relay 170 is connected to receive an output from the reader contacts 171 whenever a programmed stop is called for on the tape. The relay 170, when operated, opens the energizing line 172 to the stepping input 159 of the reader. Accordingly, the automatic stepping functions holds at this point. However, the back contacts or the normally closed contacts 174 of the stop override switch 62 may be manually operated to override the programmed stop. When this switch is depressed, the contacts 174 are opened, preventing the operation of relay 170.

Also, as shown in FIG. 7, the reader 41 contains a further set of contacts at 80 which respond to the presence of the interlock hole in line 9 of row 8 on the tape block. The contacts 180 are connected to the interlock relay 74 (FIG. 4) and operate, as previously noted, to prevent table movement while the tape is advancing in the reader.

It will be seen that this invention provides a versatile automatic welding system which may be operated to make circuit connections and welds on miniature circuit boards, wafers, and the like with speed and precision. The system is numerically controlled and causes a workpiece to be positioned in accordance with precise coordinates which are directely related to the part, itself. Accordingly, rapid operations on identical workpieces may be accurately achieved.

The system is also versatile permitting either manual or automatic control. If desired, the automatic welding system may be disabled and manual welding may be effected in combination with automatic positioning. All of the desired functions can be put into a tape, and the exact X and Y coordinate positions to be stored at positions which are read directly from the digital input switches. The system is also adjustable for use in combination with a computer, and the inputs can be controlled directly from the output of such a computer.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A tape controlled automatic welding station for positioning the platform of a plotter table in relation to the head of a controllable welder for accurately and automatically positioning a circuit board for welding at a plurality of discrete positions with respect to the position of said welder head and for making a tape in accordance with the actual said positions of desired welds on said circuit board, comprising an X–Y plotter table having controllable drive means for accurately positioning said table along X and Y coordinates with respect to said welder head, manually operable control means for positioning said table in each of said coordinates including a plurality of digital switches having positions corresponding to discrete X and Y coordinate positions of said table, a tape punch, a programmer connected to said punch and further having a connection to said switches, means operating said programmer to read out the position of said switches and to operate said punch to form a permanent record of the positions of said table on said tape, further means in said programmer operable to cause said punch to encode on said tape a weld signal, and said welder being operated upon the occurrence of one of said weld signals at one of said coordinate table positions.

2. The apparatus of claim 1 in which the coordinate position information for said weld signal is stored in said tape in block form, and further comprising motion detector means responsive to the presence of motion of said tape for preventing operation of said welder.

3. A control system for positioning a workpiece into a plurality of pre-selected discrete positions and for programming a permanent record of such positions for use with subsequent said workpieces, comprising manually controllable digital signal generating and storing means, a digital-to-analog converter, an X–Y plotter having analog X and Y input connected to receive analog information from said converter and further having means thereon for supporting the workpiece in an infinite number of X–Y positions, whereby the information signal generated by said manually controllable digital signal generating means corresponding to an X–Y coordinate is fed to said digital-to-analog converter and the analog signal so created is fed into said analog inputs of said X–Y plotter to move the workpiece into such discrete positions as may be determined by direct observation thereof, a programmer and a permanent recorder generator, said digital information from said manually controllable signal generating means also feeding said programmer which applies said digital information directly to said record generator to form a permanent record of each said position of the workpiece as represented by the X–Y digital information.

4. The control system of claim 3 further comprising a welding station which is fixed in relation to said plotter and having a controllable welding head adapted to move on command into contact with a workpiece supported thereon and to effect a weld thereat, and means for making a permanent record of welding information in each of the discrete locations selectable by said manually-operable X and Y signal generating means.

5. The system of claim 4 further comprising X and Y motion detectors, and interlock means connected to prevent the operation of said welding head during motion of said plotter and thereafter to initiate operation of said head.

6. A numerically controlled automatic welding system for making welds at precise coordinate positions on electric parts such as on miniature circuit boards and the like, comprising a welder having a controllable head operable on a signal to effect the welding of a part on such board, a plotter table having a movable platform adapted to support such a board for welding under said head and having separate X and Y inputs for moving said table into a plurality of discrete coordinate positions with respect to said welding head, X and Y converter drive means operable to apply a signal to said X and Y plotter inputs for driving said table to such discrete positions, a reuseable permanent record containing sequentially stored information corresponding to said discrete coordinate positions of said platform and further having stored weld head commands, a reader for said record, and means connecting said converter drive means and said welder head for control by said reader.

7. The welding system of claim 6 further comprising motion detector means for disabling the operation of said welder head during movement of said plotter table.

8. The welding system of claim 6 further comprising means for signaling the completion of a weld and for controlling operation of said reader to respond to additional such sequentially stored information upon such weld completion.

9. A numerically controlled automatic welding system for making welds at precise coordinate positions on electric parts such as on miniature circuit boards and the like, comprising a welder having a controllable head movable on a signal between a retracted position and a welding position, a plotter table having a movable platform adapted to support such an electrical part for welding under said head and having separate X and Y inputs for moving said table into a plurality of discrete coordinate positions with respect to said welding head, a plurality of manually controllable digital switches representing said discrete X and Y coordinate table positions, separate X and Y converter drive means connected to said switches and operable to apply a signal respectively to said X and Y plotter inputs for driving said table to corresponding positions represented by the positions of said switches, a controllable block tape punch, programmer means having an output connected to control the operation of said punch and having an input adapted to be connected to said switches and operable to transform signals from said switches to a punch input and to operate said punch to form a reusable record of each said table position selected by said switches on a strip of tape, manually controllable means connected to said programmer for inserting a signal on said tape signifying that a weld operation is desired at said positions, a reader for said tape, and means connecting said converter and said weld head for control by said reader.

10. The automatic welding system of claim 9 further comprising motion detector means for disabling the operation of said welding head during movement of said plotter table.

11. The automatic welding system of claim 9 further comprising means forming a programmed stop signal, means connected to said programmer for inserting said stop signal into said tape, and means connected to override said programmed stop signal during operation of said system by said reader.

12. The automatic welding system of claim 9 further comprising means in said welder for signaling the completion of a weld and for applying a stepping command to said reader.

References Cited

UNITED STATES PATENTS

| | | |
|---|---|---|
| 2,475,245 | 7/1949 | Leaver et al. |
| 2,537,770 | 1/1951 | Livingston et al. |
| 2,833,941 | 5/1958 | Rosenberg et al. ____ 318—39 X |
| 2,996,348 | 8/1961 | Rosenberg. |
| 3,238,430 | 3/1966 | Schuman. |
| 2,464,906 | 3/1949 | Unger _____ 219—87 |

RICHARD M. WOOD, *Primary Examiner.*

B. A. STEIN, *Assistant Examiner.*

U.S. Cl. X.R.

90—13.99; 318—162